Sept. 5, 1961 L. BACK ET AL 2,998,788
DEVICE FOR FORMING AND APPLYING POURING SPOUTS TO CONTAINERS
Filed Aug. 20, 1958 6 Sheets-Sheet 1
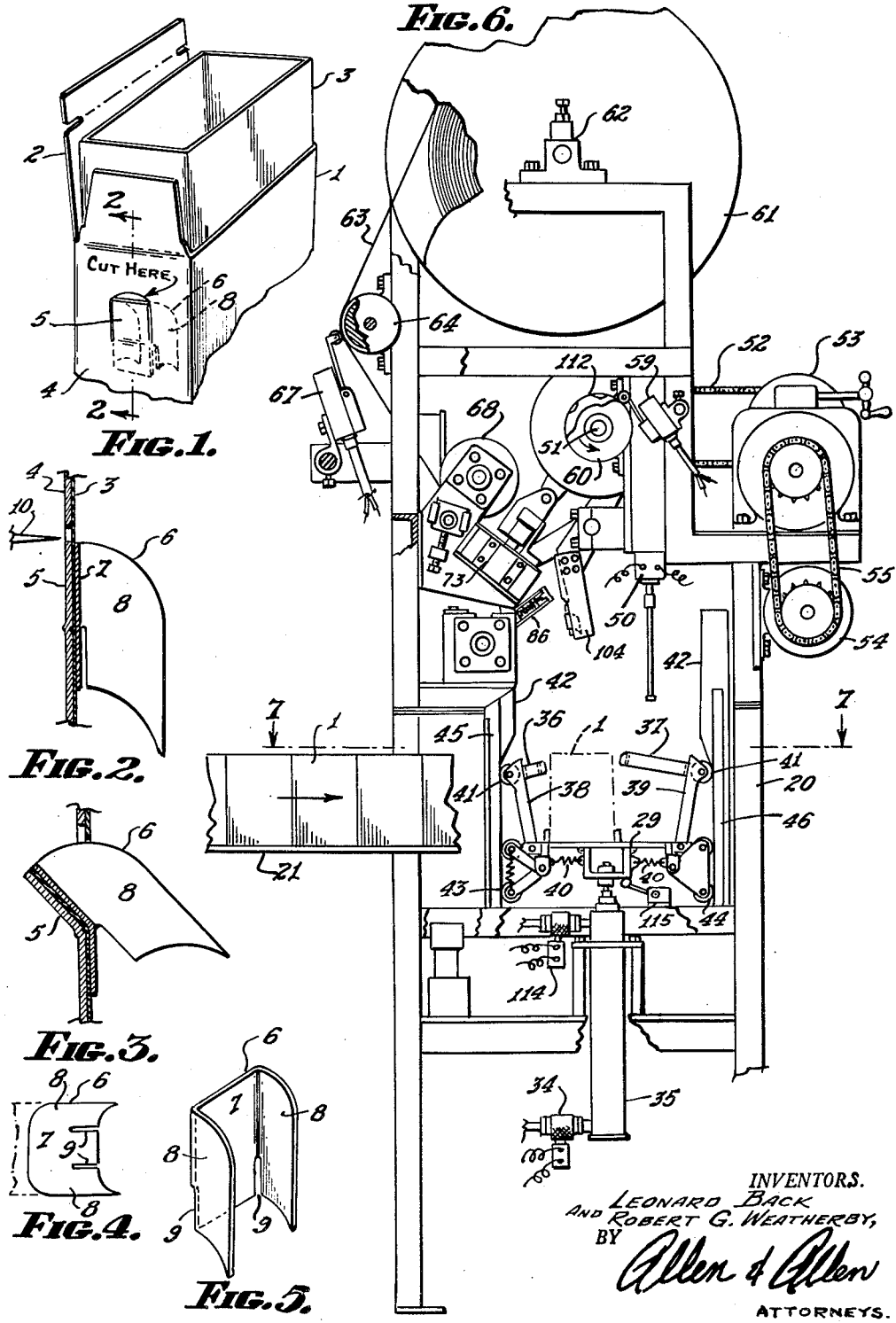
INVENTORS.
LEONARD BACK
AND ROBERT G. WEATHERBY,
BY
ATTORNEYS.

INVENTORS.
LEONARD BACK
AND ROBERT G. WEATHERBY,
BY

ATTORNEYS.

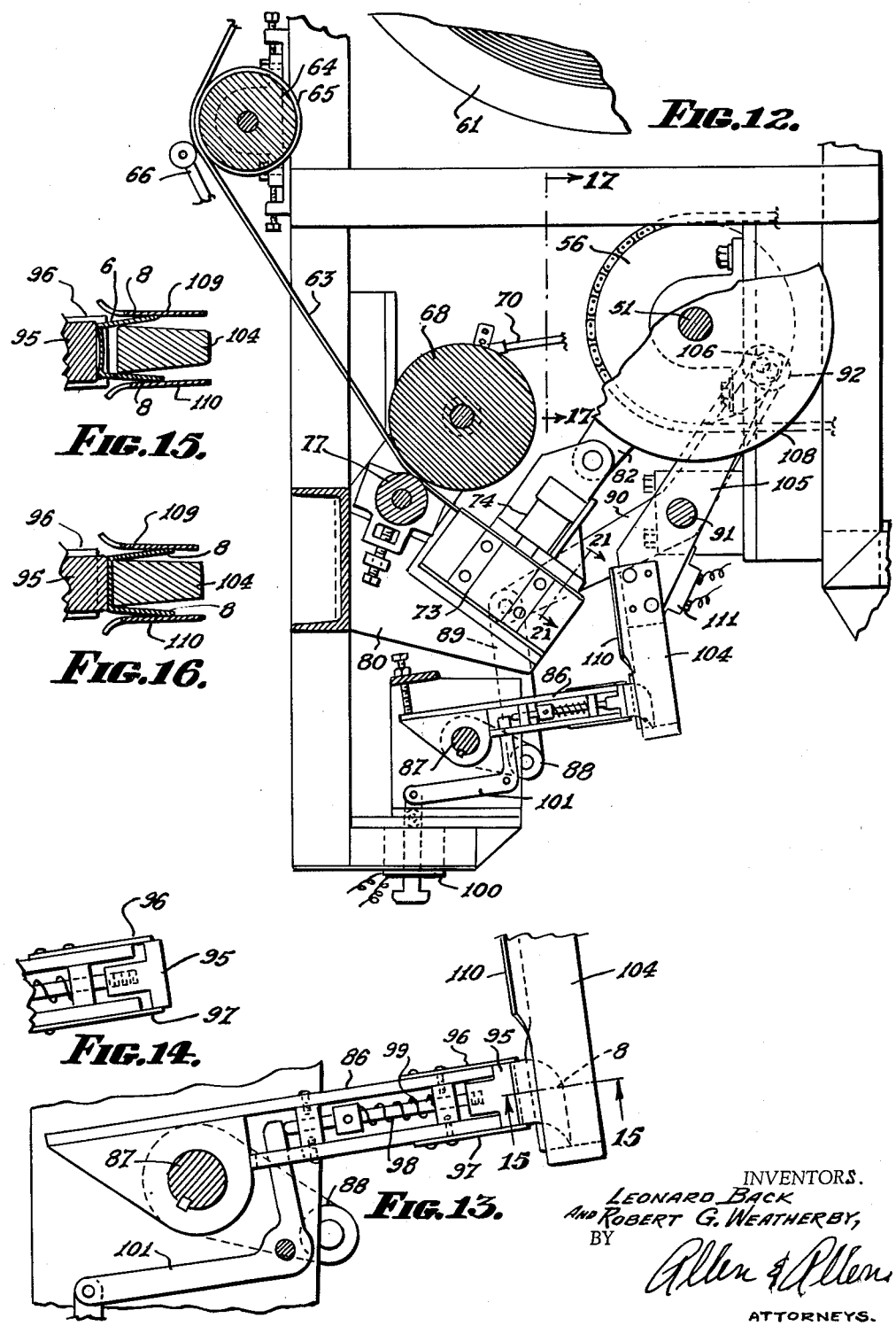

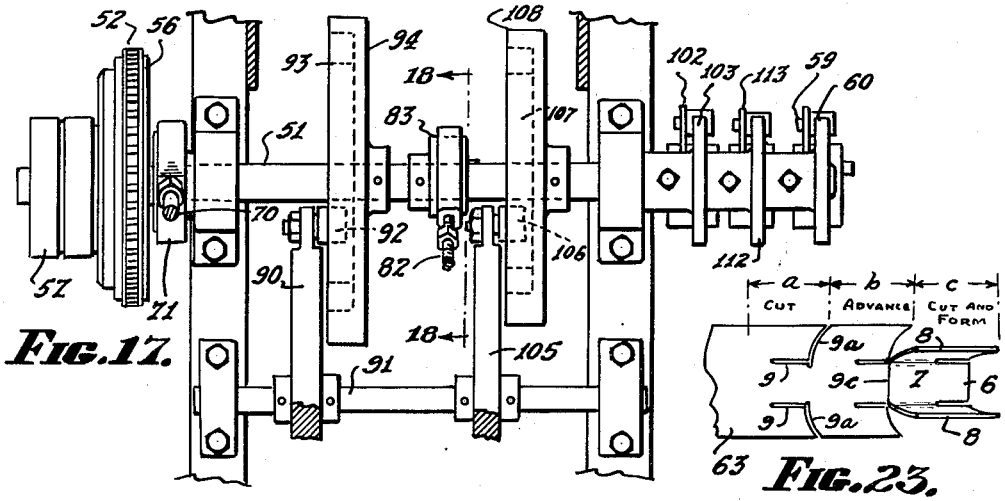
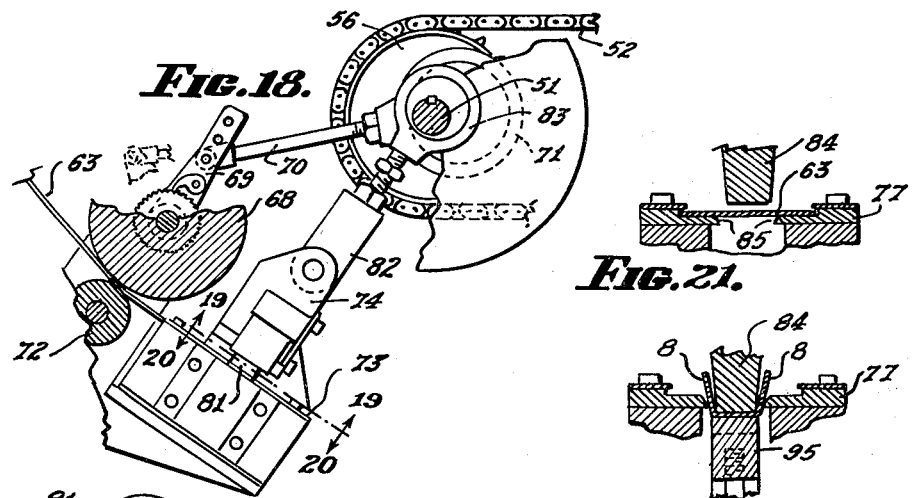
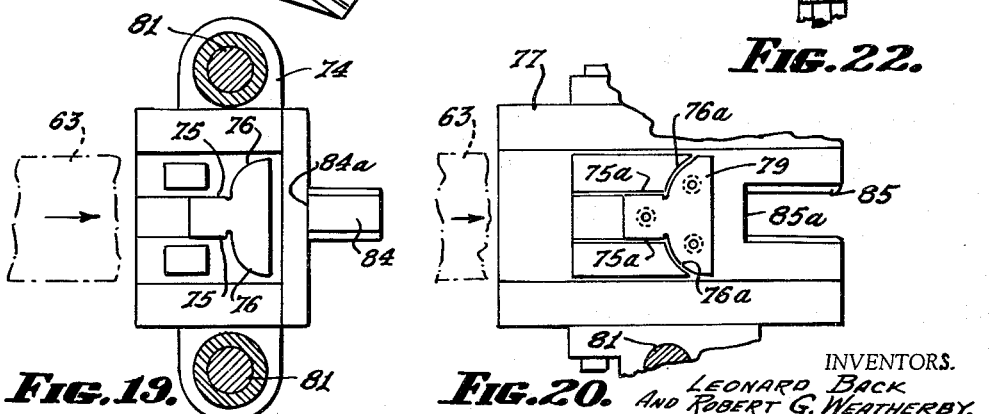

United States Patent Office 2,998,788
Patented Sept. 5, 1961

2,998,788
DEVICE FOR FORMING AND APPLYING POURING SPOUTS TO CONTAINERS
Leonard Back and Robert G. Weatherby, Middletown, Ohio, assignors to The Interstate Folding Box Company, Middletown, Ohio, a corporation of Ohio
Filed Aug. 20, 1958, Ser. No. 756,195
17 Claims. (Cl. 113—1)

This invention relates to a device for applying pouring spouts to containers and more particularly to a high speed automatic machine which both forms the spout structures and affixes them to the containers with which they are used.

Specifically, the instant device is adapted to form and apply metallic foil pouring spouts of the type disclosed in Frank D. Bergstein application Serial No. 641,750, filed February 21, 1957 and entitled "Self-Forming Pouring Spout for Containers," now Patent No. 2,862,649. As disclosed therein, a paperboard container having tubular body walls and end closures is formed with a flap struck from one of the body walls so as to have free upper and side edges with the lower edge of the flap hingedly connected to the body wall. A foil spout member is juxtaposed to the inner surface of the flap, the spout forming member having a centrally disposed base portion which is secured to the flap, and wing portions projecting outwardly at angles from opposite sides of the base portion, the arrangement being such that as the flap and the base portion of the spout are displaced outwardly from the plane of the container body wall, the wing portions of the spout will be drawn through the opening exposed by the displaced flap, thereby providing a pouring spout for dispensing the content of the container. The spout structure is preferably formed from aluminum and may comprise either a relative stiff foil or it may be of the so-called dead-soft or dead folding variety.

The pouring spout structure just described has been found ideally suited for use in both unlined containers and in lined containers wherein a tubular liner formed from non-fibrous film such as polyethylene, acetate, foil laminated to paper, and the like, form an enclosing package for the contents. Where such liners are employed, the foil pouring spout is applied to the inner surface of the liner in registry with the flap in the container body wall, and the liner is secured to the inner surface of the flap. With this arrangement, the container when sealed at both ends is completely sealed against moisture and the like—depending upon the nature of the liner—until the user severs the liner, as by inserting a knife along the upper edges of the flap, and breaks out the pouring spout. In order to obtain proper registry between the parts, particularly where a liner is employed, as well as permit the use of a preformed spout, it has been found desirable to insert the pouring spout structures after the containers and their liners have been erected, the spout structures being inserted through the open upper end of the containers.

Accordingly, it is a principal object of the instant invention to provide an automatically acting device to which erected containers will be delivered with their open end uppermost, the containers being engaged by indexing means which position them for the application of the pouring spouts. The invention also contemplates the provision of automatically acting spout inserting means effective to insert the pouring spout structures into the containers and adhere them in registry with the pouring flap.

A further object of the invention is the provision of means acting in conjunction with the spout inserting means which will automatically form the spouts from a continuous length of foil, the spouts as they are formed being automatically delivered to the spout inserting mechanism.

Still a further object of the invention is the provision of a high speed automatically acting device which forms the pouring spouts and inserts them in the containers, all in a continuous operation, the device acting to deliver the containers in condition for subsequent filling and final sealing.

The foregoing, together with other objects of the invention which will appear hereinafter or which will be apparent to the skilled worker upon the reading of these specifications, are accomplished by that construction and arrangement of parts of which an exemplary embodiment will now be described.

Reference is now made to the accompanying drawings wherein:

FIGURE 1 is a fragmentary perspective view of a container formed in accordance with the instant invention.

FIGURE 2 is a vertical sectional view taken along the line 2—2 of FIGURE 1.

FIGURE 3 is a vertical sectional view similar to FIGURE 2 but showing the parts in an alternate position of use.

FIGURE 4 is a fragmentary plan view showing the blank from which the pouring spouts are formed.

FIGURE 5 is a perspective view of the spout structure as it would appear in use.

FIGURE 6 is a side elevational view of the device in accordance with the invention.

FIGURE 12 is an enlarged fragmentary view with parts in section illustrating details of the spout forming and applying mechanism.

FIGURE 13 is an enlarged partially sectional view of the spout transfer mechanism.

FIGURE 14 is an enlarged fragmentary view of the head of the spout transfer mechanism.

FIGURE 15 is a sectional view taken along the line 15—15 of FIGURE 13.

FIGURE 16 is similar to FIGURE 15 but with the parts in a different position.

FIGURE 17 is a vertical sectional view of the timing cams taken along the line 17—17 of FIGURE 12.

FIGURE 18 is a fragmentary sectional view taken along the line 18—18 of FIGURE 17.

FIGURE 19 is a sectional view of the spout forming die taken along the line 19—19 of FIGURE 18.

FIGURE 20 is a sectional view of the base die element taken along the line 20—20 of FIGURE 18.

FIGURE 21 is a fragmentary sectional view taken along the line 21—21 of FIGURE 12.

FIGURE 22 is a sectional view similar to FIGURE 21 but with the transfer mechanism in the position illustrated in FIGURE 10.

FIGURE 23 is a fragmentary plan view of the foil strip illustrating the successive die cutting and forming operations.

Figure 9:
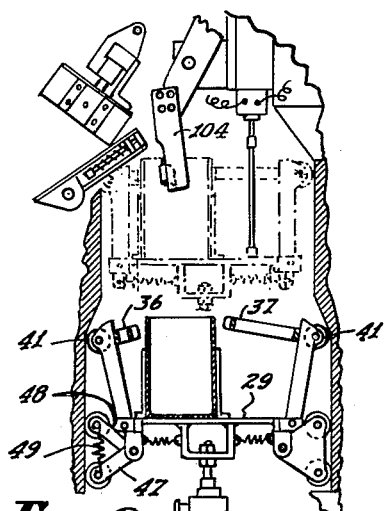
FIGURES 9, 10 and 11 are fragmentary views similar to FIGURE 8 but illustrating the parts in various positions during each cycle of operation.

Before taking up the construction and operation of the device, reference is first made to FIGURES 1 through 5 of the drawings for an understanding of the construction of the container and the pouring spout associated therewith. As seen in FIGURE 1, the container 1 may comprise a conventional tubular carton body adapted to be closed at its opposite ends by closure flaps 2. While the container will be erected and its lowermost end closed, the uppermost end of the container will be maintained in open condition, together with its liner 3, for the insertion of the pouring spout. One of the container walls, such as the wall 4, will be provided with a flap 5. Preferably, the flap 5 will be separated from the wall 4 along its upper and opposite side edges, so as to be hingedly connected to the wall along its lowermost edge.

As seen in FIGURE 4, the spout structure 6 is formed from a strip of foil and comprises a base portion 7 and projecting wing portions 8. Lines of cut 9 serve to separate the base and wing portions throughout a portion of their common extent. During the operation of the machine, the pouring spout structure just described is formed to the configuration illustrated in FIGURE 5, the wing portions 8 being folded at angles to the base portion 7, the folding occurring along lines in prolongation of the lines of cut 9. As best seen in FIGURE 2 the spout structure is secured to the inner surface of the liner 3 in registry with the flap 5, with the upper edge of the spout structure in alignment with the upper edge of the flap. This results in the lowermost part of the base portion projecting downwardly beyond the line of hinged connection of the flap to body wall 4. When the flap is opened, as by the insertion of a knife or the like 10 along the uppermost edge of the flap, the flap and spout will fold outwardly in the manner seen in FIGURE 3. The spout will remain in open position by reason of the dead-folding characteristic of the foil which bridges the hinge line of the flap. Of course, when positive inwardly directed pressure is applied against the flap 5, it will return to the plane of the body wall.

In accordance with the invention, both the outer surface of the liner 3 and the outer surface of the spout structure 6 are coated with a heat sealing material so that the parts may be adhered together by the application of heat and pressure. Such precoating of the parts has been found more desirable than endeavoring to spot an active adhesive on the spout structures during the course of the machine operations, but this latter expedient is likewise within the scope of the invention. Similarly, it should be apparent that the necessary adhesion may be obtained if either of the meeting surfaces are heat sealable. In the case of an unlined carton excellent results are obtained if there is a heat sealable coating on the base area of the metal spout. In the case of an unlined carton a heat sealable coating may be applied to the inside of the carton where the spout is to be adhered, and in the case of a lined carton a patch or spot of heat sealable coating may be applied to the corresponding part of the inside of the liner.

Figure 7:
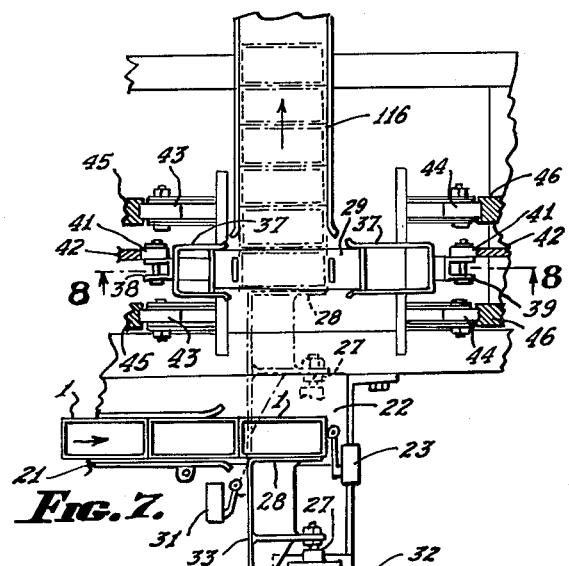
FIGURE 7 is a horizontal sectional view taken along the line 7—7 of FIGURE 6.

Referring now to FIGURES 6 and 7, all of the operating components of the device are mounted on a supporting frame 20 to which the containers 1 are delivered in single file along a trackway or conveyor 21. It will be understood, of course, that the containers are delivered in erected condition with their open end uppermost.

Container receiving and positioning mechanism

At the receiving end of the device, the containers are received one at a time on a receiving platform 22 (FIGURE 7). As a container moves across the receiving platform to a predetermined position, it contacts a limit switch 23 which forms a circuit to solenoid valve 24 which serves to introduce air under pressure from supply line 25 into one end of pneumatic cylinder 26. The piston 27 of the cylinder mounts a pusher 28 arranged to engage the container in contact with limit switch 23 and advance the container at right angles to its original direction of movement. Thus, the pusher is adapted to advance the container from the position illustrated in solid lines in FIGURE 7 to the position illustrated in dotted lines, the latter position overlying an elevator or lift platform 29 which thereafter raises the container to spout receiving position. As the pusher is advanced to its farmost position, a trailing finger 30 contacts and closes a limit switch 31. The closing of limit switch 31 serves to actuate solenoid valve 32 which acts to inject air under pressure in the opposite end of cylinder 26 and hence retracts piston 27 and the attached pusher 28. In this connection, it will be understood that solenoid valve 24 will be deenergized upon the reopening of switch 23 which occurs as the pusher 28 advances the leading conainer toward the lift platform. It will be understood, also, that the side edge 33 of the pusher will serve to prevent the next adjacent container on conveyor 21 from advancing onto receiving platform 22 until the pusher has been returned to its fully retracted position.

In addition to actuating the solenoid 32 for the pusher cylinder, the closing of switch 31 also forms a circuit to solenoid valve 34 (FIGURE 6) at the lowermost end of pneumatic cylinder 35 which acts to raise and lower the elevator or lift platform 29.

As the lift platform moves upwardly, the container thereon is engaged by a pair of gripping members 36 and 37 which firmly engage the walls of the container adjacent their upper ends. The gripping members are mounted on lever arms 38 and 39, respectively, which are pivoted to the platform 29 and spring biased outwardly to a nonengaging position by means of springs 40. Near their upper ends of the arms 38 and 39 mount rollers 41 adapted to follow inclined cam tracks 42 which, as the platform moves upwardly, act to pivot the lever arms inwardly against the tension of springs 40, thereby causing the gripping members 36 and 37 to engage about the container and hold it firmly in place. The platform also mounts sets of guide rollers 43, 44 arranged to travel along vertically disposed tracks 45, 46 which serve to guide the platform in a true vertical path as it is raised. To this end, the sets of rollers 43 may be independently mounted, as by means of arms 47 and 48 (FIGURE 9), biased toward each other by springs 49. This arrangement compensates for any variation in the distance between the opposed tracks 45 and 46 and assures true vertical movement of the lift platform. When the platform reaches its uppermost position, it contacts and closes a switch 50 which initiates the operation of the spout forming and applying mechanism the operation of which shall now be described in detail.

Actuating mechanism

The heart of the machine is the cam shaft 51 which serves to power or energize the various components which form and apply the spout structures. As probably best seen in FIGURE 6, the cam shaft 51 is adapted to be driven from chain 52 operatively connected to reduction gear mechanism 53 which is in turn driven from prime mover 54 by chain 55. Referring now to FIGURE 17, the drive chain 52 passes around an idler sprocket 56 mounted on cam shaft 51, the cam shaft also mounting an electrically operated single revolution clutch 57 which, upon energization, serve to operatively connect the cam shaft to sprocket 56. The single revolution clutch is energized by switch 50 which closes as the lift platform 29 reaches its uppermost position.

Figure 24:
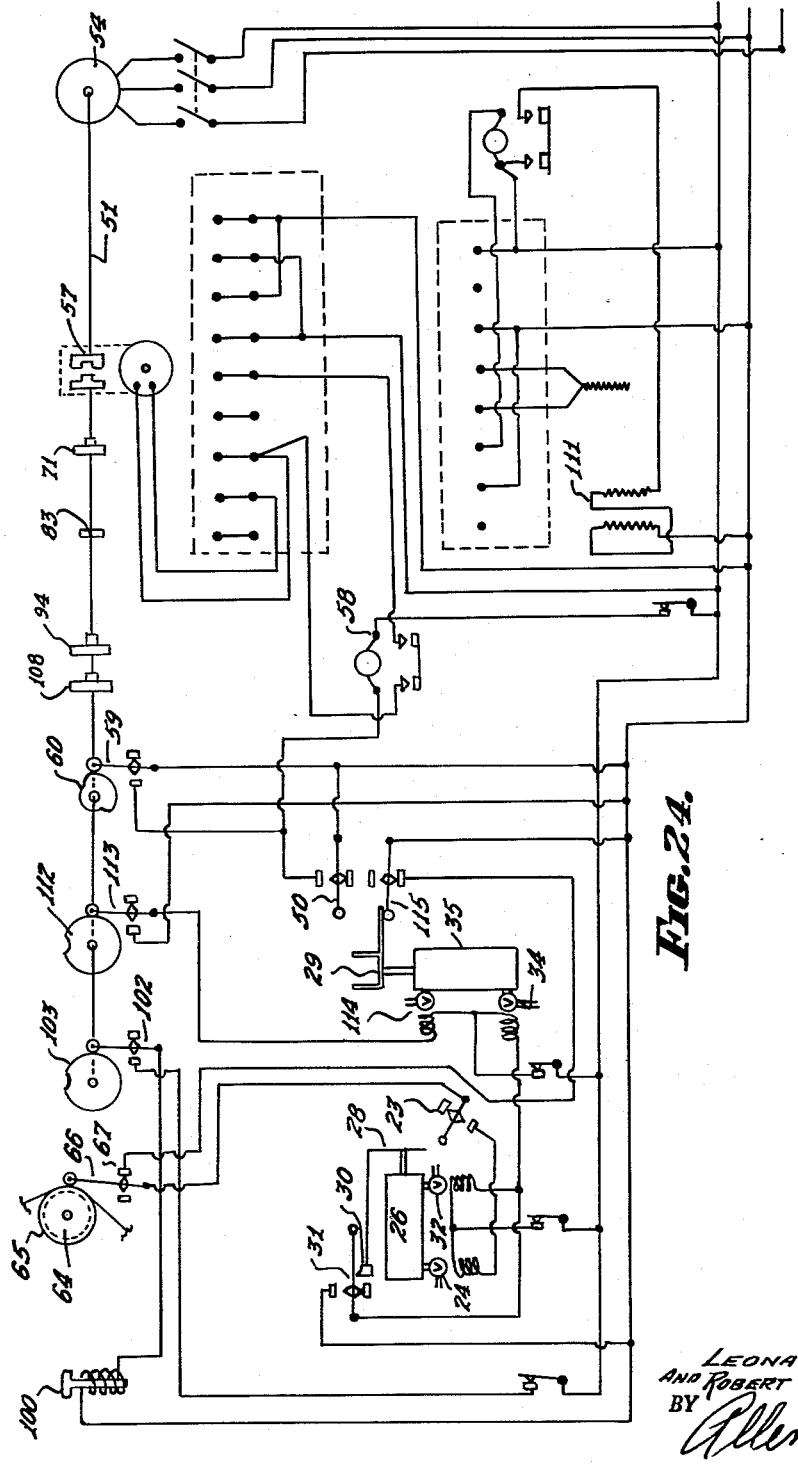
FIGURE 24 is a wiring diagram of the device.

Referring to the wiring diagram shown in FIGURE 24, it will be seen that the closing of the switch 50 acts through a holding relay 58 to energize the single revolution clutch 57. The circuit also includes a normally open switch 59 which is adapted to be closed by cam 60 mounted on cam shaft 61. The cam 60 is so configured that the switch 59 will be closed during the second half of the operating cycle, thereby maintaining the circuit to the single revolution clutch until the cam shaft has completed its cycle. Otherwise, the circuit would be broken as the platform 29 begins its downward movement and switch 50 is opened.

Foil feeding and spout forming mechanism

Referring now to FIGURES 6 and 12, the foil from which the spouts are formed is fed in strip form from a roll 61 mounted in a suitable roll stand 62 at the top of the machine. The foil strip 63 is fed downwardly about a roller 64 having a peripheral groove 65 into which the arm 66 of normally open switch 67 is adapted to fall in the absence of the foil strip passing around the roller. The foil strip prevents the arm 66 from entering the groove and hence maintains the switch 67 in closed position. Referring again to the wiring diagram of FIGURE 24, it will be seen that the switch 67 forms a part of the starting circuit including limit switch 23. Thus, should the foil supply be interrupted and the switch 67 opened by entering groove 65, the pusher mechanism will be deactivated and the machine operations will stop.

The foil strip is advanced by means of a feed roller 68 which advances the strip in increments by means of the pawl and ratchet mechanism 69 best seen in FIGURE 18, which is connected through arm 70 to eccentric 71 on cam shaft 51. With each stroke of the arm 70, the foil strip will be advanced between the feed roller 68 and its coacting roller 72, the strip advancing between the platen of a die 73 wherein the strip is cut and formed into spout structures.

As best seen in FIGURE 23, the die cutting and forming operation is performed in three stages, the initial stage "a" comprising the cutting of the strip to form the line of cut 9 together with their arcuate extensions 9a which define the lower edges of the wing portions 8 of the finished spout structures. The second stage "b" serves to advance or index the cut strip preparatory to the final stage "c" in which the wing portions 8 are folded relative to base portion 7 and the spout structure severed from the strip along the line of cut 9c.

The upper die platen 74 (FIGURE 19) is provided with cutting edges 75 and 76 which coact with the mating cutting edges 75a, 76a of the lower platen member 77 (FIGURE 20), the lower platen member also incorporating a spring pressed die plate 79. The lower platen 77 is fixedly secured to a support 80 forming a part of the machine frame, and the upper platen 74 is mounted on post 81 for reciprocating movement relative to the lower platen. The upper platen is reciprocated into and out of engagement with the lower platen by means of arm 82 and eccentric 83 (FIGURE 18), the eccentric 83 being operatively connected to cam shaft 51 and hence operable in synchronism with the advancing movement of strip 63 as it is advanced by roller 68.

The upper platen 74 also carries a nose 84 which coacts with an opening 85 in lower platen 77 to perform the "c" stage cutting and forming operation. This operation can be best seen in FIGURES 21 and 22 wherein it can be seen that as the nose 84 moves downwardly, it contacts the base portion of the spout and presses it downwardly into the opening 85, the opposite side edges of the opening serving to fold the wing portions 8 upwardly in the manner shown in FIGURE 22. At the same time, the edge 84a of the nose coacts with the edge 85a of the opening to sever the strip along the line 9c. The "c" stage operation also serves to engage the now-formed spout structure with the head of the transfer mechanism which will now be described.

The transfer mechanism

As best seen in FIGURES 12 and 13, the transfer mechanism comprises an arm 86 pivoted to rock shaft 87 journaled to the machine frame. A crank arm 88 serves to rock the shaft 87 and transfer arm 86, the crank arm being connected through link 89 (FIGURE 12) to one arm of bell crank 90 which is freely movable on fulcrum bar 91 mounted to the machine frame beneath the cam shaft 51. The opposite end of bell crank 90 mounts a cam follower 92 which rides in the groove 93 of transfer cam 94 mounted on the cam shaft 51 for rotation therewith. As the cam 94 rotates, it acts through the bell crank 90 and associated linkage to move the transfer arm 86 from the position illustrated in FIGURE 10, wherein the transfer arm is associated with the spout forming die 73, to the position illustrated in FIGURE 12 wherein the transfer arm is associated with the sealing arm which inserts the spout in the container.

At its free end, the transfer arm 86 has a head composed of plunger 95 and spring fingers 96, 97 lying on opposite sides of the plunger when the plunger 95 is in retracted position. The fingers project beyond the outermost end of the plunger and serve to receive and grip the pouring spout structures as the "c" stage of their formation is completed. Thus, when the nose 84 of the upper die platen moves the spout structure downwardly through opening 85 (FIGURE 22), the base portion 7 of the spout structure is pressed into contact with the plunger 95, with the opposite end edges of the base portion engaged and retained by the fingers 96 and 97. Then, as the transfer arm pivots downwardly, which will occur after the die platen separate, the formed spout will be carried by the fingers on the transfer arm. When the transfer arm reaches spout transferring position, i.e. the position of FIGURES 12 and 13, the plunger 95 will be actuated to eject the spout. To this end, the plunger 95 is secured to one end of an axially movable rod 98 which is normally biased to retracted position by means of spring 99. The plunger is adapted to be actuated by means of solenoid 100 (FIGURE 12) which acts through bell crank 101 to press against the rearmost end of rod 98 and move it axially against the compression of spring 99. The solenoid 100 is actuated by means of switch 102 (FIGURES 17 and 24) which is closed at the proper time by cam 103 on cam shaft 51.

The sealing mechanism

The sealing mechanism comprises an anvil arm 104 which extends downwardly from a bell crank 105 also freely mounted on fulcrum bar 91. The bell crank 105 has a cam follower 106 arranged to ride in channel 107 of sealer cam 108 which, as best seen in FIGURE 17, is mounted on cam shaft 51 and hence operable in timed relation to the various other components of the machine. As best seen in FIGURES 12, 15 and 16, the anvil arm has a pair of gripping plates 109, 110 extending along the opposite sides thereof, the plates being spaced from the anvil 104 and arranged to slidably receive the wing portion 8 of the spout structure as it is carried downwardly by the transfer arm. This action can be best seen in FIGURE 15. Then, when the plunger 95 is actuated to eject the spout, the base portion of the spout structure will be pressed against the face 104a of the anvil, as seen in FIGURE 16. The gripping plates 109, 110 act to frictionally engage the spout and hold it against the anvil. Immediately thereafter, the transfer arm will move upwardly and the spout structure will be held by the anvil arm.

Figure 8:
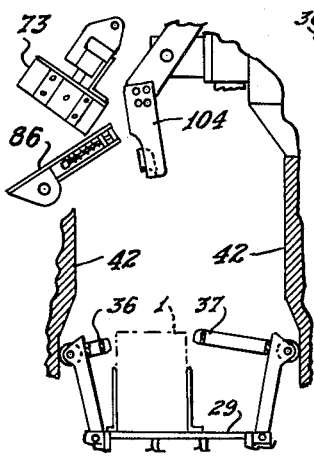
FIGURE 8 is a fragmentary elevational view with parts broken away illustrating the spout forming and applying mechanism.
Figure 11:
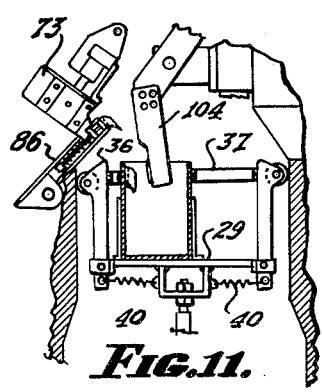

Insofar as the timing of the device is concerned, the transfer of the spout structure from the transfer arm to the anvil occurs, as seen in FIGURE 8, while the container lift platform is in its lowermost position. The spout structure is thus in contact with the anvil for a length of time sufficient for the lift platform to elevate the container to the position illustrated in dotted line in FIGURE 9, wherein it will be seen that as the container is elevated, the anvil will extend into the open mouth of the container. This time interval permits the heating of the heat seal coating on the spout structure, a heating element 111 (FIGURE 12) serving to heat the anvil and reactivate the heat seal material on the spout.

Figure 10:
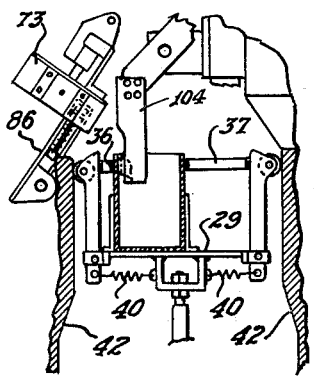

When the container reaches the position illustrated in dotted lines in FIGURE 9, the sealer cam 108 acts through bell crank 105 to thrust the anvil forward and press the base portion of the spout structure against the inner wall surface of the container, as illustrated in FIGURE 10. In this connection, it will be noted that the container is supported exteriorly by the gripping member 36. Positive sealing pressure is thus applied to both sides of the container and the spout will be firmly sealed in place. Where the container is lined, sufficient heat will be generated by the heating element 111 to cause reactivation of the heat seal coating on the liner, so that the contacted portion of the liner will be sealed to the inner surface of the flap 5. It will be understood, of course, that the parts will be so adjusted that the anvil will deposit the spout structure in registry with the flap in the container wall.

Subsequent to the application of the spout to the container wall, the sealer cam 108 will cause the anvil to retract to the position illustrated in dotted lines in FIGURE 10, whereupon the container will be free to move downwardly. The downward movement of the container carrying platform 29 is initiated by still another cam 112 on cam shaft 51 (FIGURE 17), the cam 112 serving to close switch 113 which forms a circuit to energize solenoid valve 114 at the upper end of pneumatic cylinder 35 (FIGURE 6), thereby effecting a downstroke of the piston in cylinder 35 and lowering platform 29. When the platform reaches its lowermost position it closes a switch 115 which, as will be evident from the wiring diagram of FIGURE 24, forms a part of the starting circuit for initiating movement of pusher 28. Thus, the pusher actuating circuit will be deenergized either when the switch 67 is open or when the switch 115 is open, the latter being the case whenever the container lifting platform is in elevated position.

As the lift platform 29 moves downwardly, the gripping members 36 and 37 will move outwardly as the rollers 41 drop off the rises of cam tracks 42, and the container will be released. It will be advanced into the exit chute 116 by the next successive container presented to the lift platform by pusher 28. From the chute 116 the containers may be delivered to an exit conveyor or other means for removing them from the device.

Figure 25:
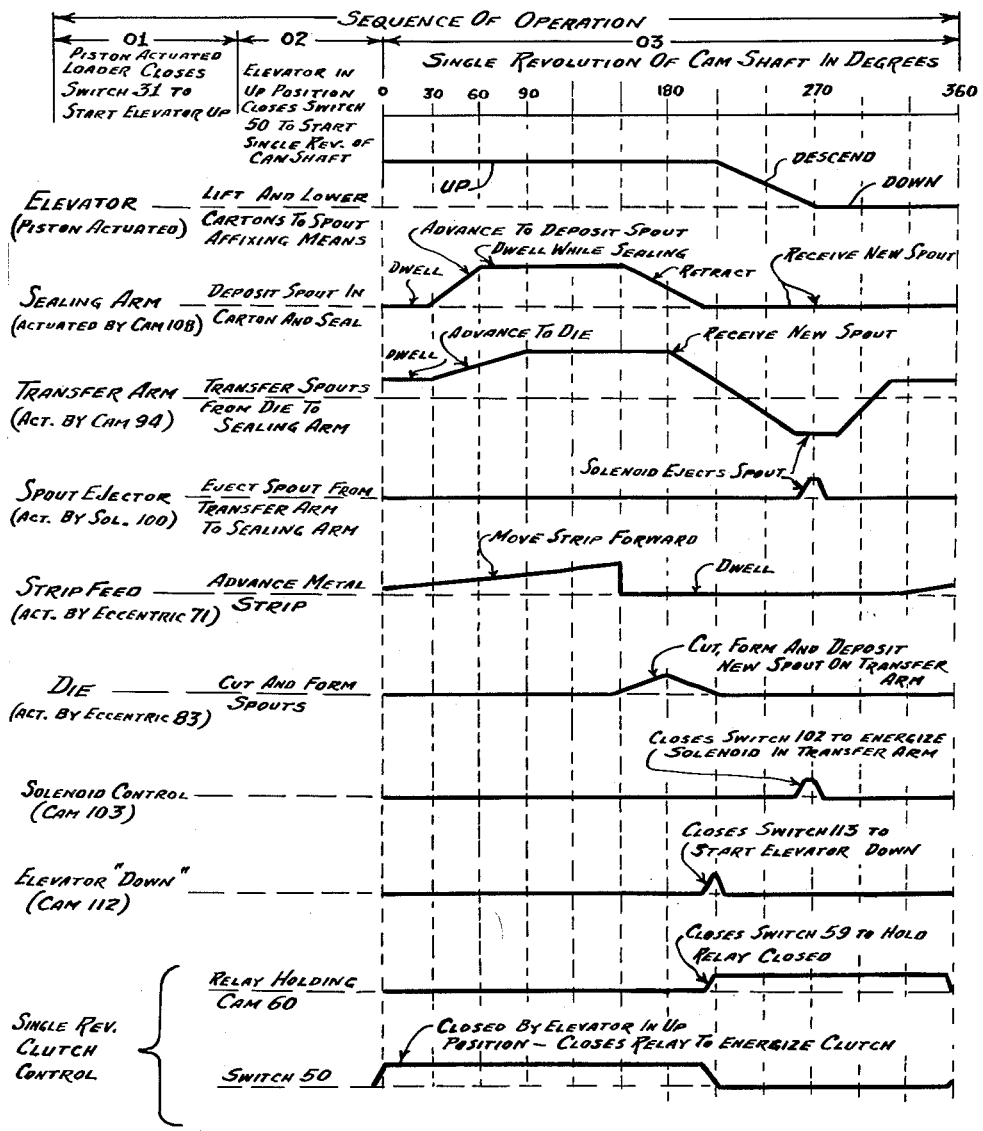
FIGURE 25 is a chart illustrating the timing sequence of the various machine operations.

It will be evident from the foregoing that the successful operation of the device depends upon the timing of the parts, with the cam shaft 51 and the associated cams acting to initiate the various operations in synchronism. In this connection reference is made to FIGURE 25 of the drawings wherein the sequence of operations has been charted in terms of degrees of rotation of the cam shaft. This chart, for example, makes it clear that the transfer arm which transfers the spout structures from the die to the sealing anvil operates while the elevator or lift platform is moving downwardly so that the transfer arm returns to the die to receive another spout structure as the platform rises to juxtapose a succeeding container to the sealing anvil.

It will be obvious to the skilled worker in the art that various modifications may be made in the invention without departing from its spirit and purpose, and consequently it is intended that the invention not be limited excepting in the manner set forth in the claims which follow. For example, while a preferred shape for the pouring spout structure has been illustrated, it will be apparent that the spout shape could be other than that illustrated. Similarly, while the instant device contemplates the handling of a single line of containers, it will be apparent that the entire device could be modified to handle a plurality of containers at the same time. That is, the machine could be modified, where higher speeds are required, to provide a plurality of reels of foil, a corresponding number of dies, spout transfer means and spout anvils, together with the mechanism necessary to simultaneously juxtapose a container to each set of operating components.

Having thus described the invention in an exemplary embodiment what is claimed is:

1. In a device for applying a pouring spout to an inside wall surface of a container, a supporting frame, a sealing anvil pivotally mounted on said frame, actuating means for moving said anvil from a spout receiving position to a spout applying position in which said anvil is juxtaposed to a body wall of the container, transfer means movably mounted on said frame for receiving a spout structure from a source of supply and depositing it on said anvil when said anvil is in spout receiving position, means for moving said transfer means in timed relation to the movement of said anvil, a container lift platform mounted on said frame beneath said anvil, said lift platform being movable from a container receiving position to a spout receiving position in which said anvil and the spout structure carried thereby enter the opened upper end of the container positioned on said lift platform, actuating means for raising and lowering said lift platform in timed relation to the movement of said anvil and said transfer arm, said anvil actuating means acting to move said anvil to the spout applying position subsequent to the movement of said container lift platform to the spout receiving position, said lift platform actuating means thereafter acting to return said lift platform to container receiving position upon movement of said sealing anvil away from its spout applying position, and container positioning means acting in timed relation to the movement of said lift platform for discharging from said platform the container to which a spout has been applied and delivering a new container to which a spout is to be applied.

2. The device claimed in claim 1 including die means mounted on said supporting frame for forming a continuous length of spout-forming material into individual spout structures, said die means being positioned to be contacted by said transfer means, whereby individual spout structures formed by said die will be engaged by said transfer means and delivered to said anvil during each operating cycle of said device.

3. The device claimed in claim 2 including a container receiving platform for receiving containers seriatim from a source of supply, said container positioning means comprising a pusher arranged to move the containers from said receiving platform to said lift platform, and means on said lift platform operative as said lift platform moves to spout receiving position for entering into gripping engagement with the body walls of the container.

4. In a device for applying a pouring spout to a container, a supporting frame mounting a cam shaft, a single revolution clutch operatively connected to said cam shaft and acting, when engaged, to connect said cam shaft to a source of power, a sealing anvil comprising an elongated arm pivotally mounted on said frame and movable from a spout receiving position to a spout applying position, a first cam means on said cam shaft operatively connected to said anvil for moving said anvil from one position to the other, a movable transfer arm for receiving a spout structure from a source of supply and depositing it on said anvil when said anvil is in its spout receiving position, a second cam means on said cam shaft operatively connected to said transfer arm for moving said transfer arm in timed relation to the movement of said anvil, a lift platform underlying said anvil, means for moving said lift platform from a container receiving position to a spout applying position in which the open upper end of a container positioned on said lift platform is presented to said anvil, said anvil and the spout structure carried thereby entering the open end of the container, and means operative upon movement of said lift platform to the spout receiving position for actuating said single revolution clutch to initiate movement of said anvil.

5. The device claimed in claim 4 including a die mounted on said frame for forming a continuous strip of spout forming material into individual spout structures, said die having a reciprocating platen, an eccentric on said cam shaft operatively connected to said platen for reciprocating said platen, means for intermittently feeding the said strip material to said die, said feeding means including a second eccentric operatively connected to said cam shaft, said movable transfer arm acting, when actuated, to transfer a spot structure from said die and deposit it on said anvil.

6. The device claimed in claim 5 wherein said die is configured to sever the strip material into individual spout structures each having a centrally disposed base portion and wing portion, and wherein said die includes means for folding said wing portions relative to said base portion and depositing the spout structure so formed on the end of said transfer arm.

7. The device claimed in claim 6 wherein said transfer arm includes a pair of spring fingers for gripping a spout structure deposited thereon, and plunger means for removing the spout structure from between said spring fingers upon movement of said transfer arm to a spout ejecting position in which the spout structure is deposited on said anvil.

8. The device claimed in claim 7 including solenoid means for actuating said plunger to eject a spout structure from between said gripping fingers, and solenoid actuating means on said cam shaft for ejecting the spout structure in timed relation to the movement of said transfer arm.

9. The device claimed in claim 8 wherein said sealing anvil includes means for receiving the wing portions of a spout structure carried by said transfer arm.

10. The device claimed in claim 9 including means operatively connected to said cam shaft for effecting movement of said lift platform from the spout receiving position to the container receiving position subsequent to the application of a spout structure to the wall of a container positioned on said lift platform.

11. The device claimed in claim 10 wherein said single revolution clutch is an electric clutch, wherein the means for actuating said clutch upon movement of said lift platform to the anvil receiving position comprises a circuit to said electric clutch including a switch positioned to be closed by said lift platform, and wherein said circuit includes a holding relay and a second switch operatively connected to said cam shaft and adapted to be closed upon rotation thereof.

12. In a device for applying a pouring spout to a container, a supporting frame, a sealing anvil pivotally mounted on said frame and movable from a spout receiving position to a spout applying position, transfer means movably mounted on said frame, said transfer means acting to receive a spout structure from a source of supply and deposit it on said anvil when said anvil is in spout receiving position, a container lift platform underlying said anvil, said lift platform being movable from a container receiving position to a spout receiving position in which said anvil and a spout structure carried thereby enter into the open upper end of a container positioned on said lift platform, a container receiving platform for receiving containers seriatim from a source of supply, pusher means for moving a container from said receiving platform to said lift platform when said lift platform is in the container receiving position, means for actuating said pusher means upon the presentation of a container to said container receiving platform, means operable by said pusher means upon movement of a container onto said lift platform for actuating said platform moving means, and means operable upon movement of said platform lifting means to the spout receiving position for moving said anvil to the spout applying position, said anvil acting, in said spout applying position, to juxtapose the spout structure carried thereby to an inner wall surface of the container.

13. The device claimed in claim 12 wherein said pusher moving means comprises a fluid cylinder, wherein said fluid cylinder has solenoid valve means for introducing fluid therein under pressure, and wherein the means for actuating the pusher moving means comprises a limit switch contactable by a container moved onto said receiving platform.

14. The device claimed in claim 13 wherein the means for raising and lowering said lift platform comprises a second pneumatic cylinder having a solenoid valve for introducing fluid under pressure therein, and wherein the means for actuating said platform lifting means comprises a second limit switch closable by said pusher means upon movement thereof across said receiving platform.

15. The device claimed in claim 14 wherein said second limit switch also forms a circuit to a second solenoid valve effective to introduce fluid under pressure into the opposite end of said first named cylinder, whereby to return said pusher means to its starting position.

16. The device claimed in claim 15 wherein the means for moving said anvil to the spout applying position includes a cam shaft, a single revolution clutch operatively connected to said cam shaft, cam means on said shaft for moving said anvil, and switch means operable upon movement of said lift platform to the spout receiving position to actuate said single revolution clutch.

17. The device claimed in claim 16 wherein said cam shaft mounts means operative, during rotation thereof, to energize a second solenoid valve operatively connected to the pneumatic cylinder for raising and lowering said lift platform, said second solenoid valve acting to return said lift platform to its lowermost position.

References Cited in the file of this patent

UNITED STATES PATENTS

| | | |
|---|---|---|
| 1,842,455 | Lord | Jan. 26, 1932 |
| 1,953,079 | Hothersall | Apr. 3, 1934 |
| 2,216,733 | Brucker | Oct. 8, 1940 |
| 2,225,549 | Card | Dec. 17, 1940 |
| 2,589,769 | Brucker | Mar. 18, 1952 |
| 2,618,725 | Renard | Nov. 18, 1952 |
| 2,861,529 | Klausmann | Nov. 25, 1958 |
| 2,862,649 | Bergstein | Dec. 2, 1958 |